Jan. 2, 1973 H. M. ALEXANDER ET AL 3,708,386

LAMINATED SAFETY FLOAT GLASS WINDSHIELDS

Filed May 18, 1971

INVENTORS
Harold M. Alexander,
Paul T. Mattimoe and
BY John J. Hofmann
Collins & Oberlin
ATTORNEYS

United States Patent Office 3,708,386
Patented Jan. 2, 1973

3,708,386

LAMINATED SAFETY FLOAT GLASS WINDSHIELDS

Harold M. Alexander, Paul T. Mattimoe, and John J. Hofmann, Toledo, Ohio, assignors to Libbey-Owens-Ford Company, Toledo, Ohio Filed May 18, 1971, Ser. No. 144,488
Int. Cl. B32b *17/10;* C03c *27/12*
U.S. Cl. 161—165 8 Claims

ABSTRACT OF THE DISCLOSURE

An automotive windshield made up of two sheets of float glass approximately .100 of an inch thick, laminated together with an interlayer of at least .030 of an inch thick polyvinyl butyral, and with the "bath" or weak side of the float glass sheets exposed.

BACKGROUND OF THE INVENTION

Field of the invention

The present invention relates to laminated safety glass, and more particularly to a unit of this general character that involves a particular kind, thickness, combination and arrangement of glass sheets with the plastic interlayer.

Description of the prior art

Laminated glass is of course old and well known, and has been very widely used, particularly in the glazing of automobiles. Indeed, at the present time it is, and has been for a number of years, an absolute requirement for the windshields of all automobiles produced for or used in the United States. Moreover, some time prior to 1966, automobile windshield structures had become pretty well standardized as comprising two sheets of ⅛" thick plate or sheet glass laminated together with a .015" thick plastic interlayer.

However, it was subsequently determined that thicker plastic interlayers, although adding materially to the cost, were desirable and, starting with the 1966 models, all United States automotive manufacturers began requiring the .030" thick plastic interlayers that are currently employed, with the ⅛" thick glass sheets, in the HPR (high penetration resistant) laminated windshields that are now standard in the industry.

Nevertheless, injuries resulting from occupants of automobiles being thrown against the windshields still present a serious problem and, with the ever growing public awareness of the necessity for increased safety precautions, continunig efforts have been and are still being made to appreciably improve the safety factor built into standard automobile windshields.

At least some of these efforts have explored possibilities of employing various thicknesses of glass and plastic in the lamination (see, for example, U.S. Pats. Nos. 2,946,711 and 3,282,772), while others (U.S. Pat. No. 3,558,415 for example) have considered using other than the conventional, annealed "sheet" and "ground and polished plate" glass.

SUMMARY OF THE INVENTION

The present invention is concerned with both the thickness and kind of glass employed, and primarily involves combining thin, so-called float glass, in a special way, and in particular thicknesses, with the standard plastic interlayer, to provide notably improved safety characteristics in laminated safety glass windshields without materially increasing costs or interfering with conventional and established production and assembly procedures.

Accordingly it is a primary object of the invention to provide a windshield that is structurally similar to standard windshields but that is lighter in weight and, at the same time, provides substantially improved and increased factors of safety.

A more specific object is the provision of a windshield of this character that will appreciably reduce the number and severity of skin lacterations in persons thrown against the windshield under all impact conditions.

Another object is to provide in such a windshield improved ability to decelerate movement of a person thrown thereagainst, and increased penetration resistance, at both cold and hot temperatures.

And still another object is to substantially reduce the incidence of stone impact damage in windshields.

Further objects and advantages will become apparent during the course of the following description, when taken in connection with the accompanying drawings.

BRIEF DESCRIPTION OF THE DRAWINGS

In the drawings, wherein like numerals are employed to designate like parts throughout.

DESCRIPTION OF PREFERRED EMBODIMENTS

Figures 1, 2, 3:
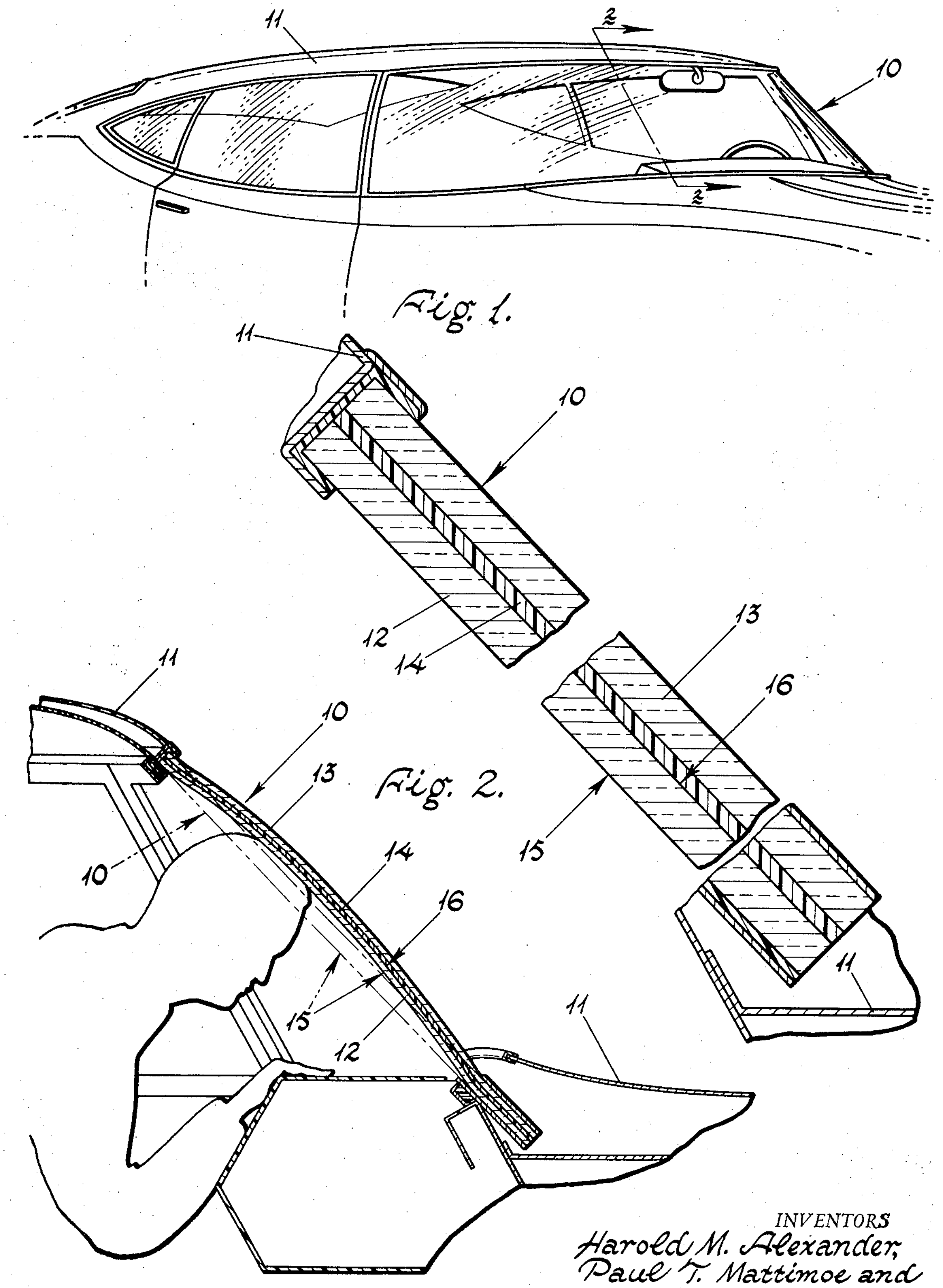
FIG. 1 is a perspective view of the front end of an automobile with a windshield, constructed in accordance with this invention, mounted therein.
FIG. 2 is a fragmentary, vertical sectional view on an enlarged scale, taken generally along the line 2—2 in FIG. 1.
FIG. 3 is a diagrammatic, vertical, sectional view through the windshield of FIGS. 1 and 2, illustrating the action of the inboard sheet of glass under impact.

As illustrated in FIG. 1 the windshield 10 of the invention is mounted in an automobile 11, and appears therein, exactly like a standard windshield. Moreover, as shown in FIG. 2, it is made up, again like the standard windshield, of two sheets of glass 12 and 13 bonded together, under heat and pressure and in the conventional manner, by an interposed layer of plastic 14. Indeed, in a preferred embodiment, the plastic interlayer 14 is a .030" thick sheet of the high penetration resistant polyvinyl butyral conventionally used for the purpose in existing standard windshields.

However, the windshield 10 of the invention differs importantly from standard windshields by the fact that the glass sheets 12 and 13 are sheets of float glass, in thicknesses no greater than .110", bonded to the plastic interlayer 14 with their "bath" side out; and by the fact that this windshield combines a remarkably greater ability to protect occupants of an automobile in which it is installed from head injuries, particularly of the lacerative type, with notably greater resistance to impact damage to the windshield itself from outside sources.

So-called "float" glass of the general character contemplated for the windshield 10 is well known and is conventionally produced as a continuous ribbon by floating molten glass on the surface of a molten metal (usually tin) bath over which a controlled non-oxidizing or reducing atmosphere is maintained. The floating molten glass naturally tends to seek its equilibrium thickness and the ribbon formed therefrom is continuously floated and advanced along the surface of the bath with the under surface of the ribbon (herein referred to as the "bath" surface) in contact therewith. The ribbon of glass, in partially hardened condition, is taken off the end of the bath on conventional conveyor rolls and carried thereby into and through an annealing leer.

The equilibrium thickness of such float glass is upwards of ¼ inch. However it is known that sheets of float glass of less than equilibrium thickness can be produced by lateral stretching of the ribbon on the bath (see U.S. Pat. No. 3,083,551 for example); but thin float glass (and particularly below ⅛"), of acceptable quality, has not been commercially available. Also, in float glass produced in the manner described, we have found that the under or "bath" surface is a "weak" surface, relative to the upper or "top" surface, presumabily because of slight scratches or abrasions inherently imparted to the lower surface as a result of its contact with the conveyor rolls.

Nevertheless, we have determined that two sheets of float glass, in thicknesses of around .100" or, more specifically, between .085" and .105", when combined with a plastic interlayer of conventional thickness, will provide a windshield that, in addition to being lighter weight and providing adequate penetration resistance, will give notably greater protection from laceration damage to the occupants of an automobile, and surprisingly greater protection from stone damage to the windshield, than will a conventional or standard windshield with an identical interlayer. Indeed appreciably better results along these lines will be obtained with the float glass sheets "in any thickness that does not exceed .110", so long as it exhibits the strength required for handling and laminating, as well as with such thin float glass sheets only on the inboard side of the windshield.

Some of this may be due to the inherently greater strength of float glass which, as evident from the following table, we have found to require a "fiber stress" to break it that may be up to 50% greater than for plate glass of equal thickness:

| Type glass | Surface tested | Modulus of rupture (p.s.i.) | | |
|---|---|---|---|---|
| | | Max. | Min. | Avg. |
| ⅛" plate | | 18,800 | 7,740 | 13,400 |
| ⅛" float | Top side | 35,500 | 7,790 | 19,900 |
| Do | Bath side | 24,300 | 10,300 | 15,600 |

However for best results, it is preferred according to the invention, that the thin float glass sheets be laminated with the "bath" side of both the inboard and outboard sheets exposed. This is important, first, because of the superior optical properties of the "bath" side of float glass sheets in the thickness range of this invention; and, second, because this arrangement of "bath" side out appears to have a definite bearing on the laceration protection properties of the structure.

Theoretically this may be because the "bath" side, although possessing superior optical properties, inherently becomes the weaker side as well, presumably because of the above mentioned tendency of the conveyor rolls, upon which the float ribbon is taken from the tin bath, to create tiny abrasions or scratches in the "bath" surface with which they are in contact. On this basis, the inboard sheet 12 of the windshield 10 in the drawings has its weaker ("bath") surface 15 facing the interior of the automobile, and its stronger surface 16 facing the interior of the windshield structure. For this reason, when an occupant of the car is thrown against the windshield, the impact (usually of the head) will cause the sheet 12 to flex outwardly as indicated in FIG. 3, and thus put the weaker surface 15 in compression. Consequently, the sheet 12 will be capable of absorbing more pressure from the impact and of storing a greater amount of the energy created before breaking, with the result that, if and when the inboard sheet does break, it has a notably lower lacerative producing tendency because it breaks into a fine, small "rice pattern" instead of shattering into the more "open" and dangerous break pattern of plate glass.

In evaluating the effectiveness of the thin float glass, windshield structure of this invention three different types of tests, using accepted test procedures for this field, were employed. The first type was to determine the laceration hazard and the ability of the windshield to resist penetration when impacted at the normal installation angle; the second was used to measure deceleration of the impacting object striking the windshield at normal incidence and, from the data obtained, to determine the GMR Severity Index; and the third was used to evaluate stone impact resistance of the windshield. The performance of the windshields were considered at cold and hot as well as normal temperatures, and throughout the test program the windshields of the invention were tested in parallel with "standard" windshields made up of two ⅛" thick sheets of plate glass and a .030" thick plastic interlayer.

Before discussing the tests in detail it should be pointed out that, as indicated above, the invention contemplates windshields made with a sheet or sheets of float glass in thicknesses not to exceed .110", combined with an interlayer of conventional thickness. More specifically, the "standard" interlayer thickness has been .015", and is currently .030" but, in preferred forms of this invention the thin float glass is combined with interlayers from .030" to .060" thick. Under test, it appears that increased plastic thickness has a major effect on the speed at which penetration and interlayer splitting occur. However, increases in the thickness of the plastic interlayer also add appreciably to the cost of the windshield, and plastic thickness appears to have relatively little effect on lacerative damage.

On the other hand, the invention contemplates the use of different thicknesses of thin float glass in the neighborhood of .100" and some improvement in the lacerative test results were obtained whenever the inboard glass sheet tested was thinner than ⅛". However, the use of appreciably thinner float glass (specifically in nominally .090" thicknesses) for both inboard and outboard sheets gave as good or better lacerative performances than any other configuration in the test series.

The tests further demonstrated that the thin float glass windshields of the invention resisted penetration and avoided major lacerations at higher impact speeds than than the standard windshields of the same size, shape and curvature. Moreover these improvements in safety performance were realized not only at median temperatures but also at high and low temperatures.

Other demonstrated advantages of the "thin float" glass windshields, and these were in the area of concussion or brain damage potential, were that they exhibited significantly reduced "Peak G Values" (the height of the "spike" on the deceleration curve that generally represents the force required to break the glass) from those obtainable with ⅛" or commercially available thicknesses of float glass; and lower "Severity Index Values" at low head-to-glass velocities (11 to 16 miles per hour) than are obtainable with either ⅛" plate glass or with ⅛" or available thicknesses of float glass.

Additional surprising results were observed in tests comparing the resistance of the windshields of the invention, with thicker (⅛") float glass windshields, and with standard ⅛" plate glass windshields, to damage by external missiles such as stones encountered in rural driving.

In these tests twenty-seven windshields of each of the three different kinds were used and windshields of each kind were impacted at ten different locations, and at nine different velocities, between 15 and 50 miles per hour, by 1/10, ¼ and 1 ounce steel balls. The results were tabulated and showed that 111 glass fractures resulted from the 170 impacts on the ⅛" plate glass windshields, and 55 fractures resulted from the ⅛" float glass windshields, but only 3 glass fractures resulted from the 270 impacts on the thin float glass (specifically .090") windshields. In addition, the fractures in the thin float glass windshields were all from impacts by one ounce balls, whereas impacts by all three sizes of balls produced fractures in the thicker float and in the plate glass windshields.

It is evident from these several tests that the thin float glass (below .110") windshields herein described embody distinct and important safety factors beyond what is offered by either the standard plate glass windshield or any windshield that utilizes float glass in the standard ⅛" glass thickness or any of the greater thicknesses in which float glass has been readily available.

We claim:

1. A laminated safety glass windshield comprising inboard and outboard sheets of glass and an interposed layer of organic plastic material all bonded together in a unitary composite structure; characterized by said inboard sheet being a sheet of float glass less than .110" thick and having the bath surface thereof exposed.

2. A windshield as defined in claim 1, in which both of said sheets are of float glass in thicknesses of approximately .100" and have the bath surfaces thereof exposed.

3. A windshield as defined in claim 2, in which said sheets are between .085" and .105" thick.

4. A windshield as defined in claim 3, in which said sheets have a nominal thickness of .100".

5. A windshield as defined in claim 3, in which said sheets have a nominal thickness of .090".

6. A windshield as defined in claim 2, in which said plastic material is polyvinyl butyral and said layer is between .030" and .060" thick.

7. A windshield as defined in claim 4, in which said plastic material is polyvinyl butryal and said layer is approximately .030" thick.

8. A windshield as defined in claim 5, in which said plastic material is a layer of a high penetration resistant polyvinyl butyral approximately .030" thick.

References Cited

UNITED STATES PATENTS

| | | | |
|---|---|---|---|
| 2,946,711 | 7/1960 | Bragaw, Jr., et al. | 161—199 |
| 3,241,938 | 3/1966 | Michalik | 65—32 |
| 3,414,464 | 12/1968 | Long | 161—1 |
| 3,453,161 | 7/1969 | Golightly | 161—199 |

WILLIAM J. VAN BALEN, Primary Examiner

U.S. Cl. X.R.

156—106; 161—199